(12) United States Patent
Hwaung (10) Patent No.: US 7,839,035 B2
(45) Date of Patent: Nov. 23, 2010

(54) POWER-DRIVEN ROLLING AND RECEIVING APPARATUS

(76) Inventor: Su-Yuan Hwaung, No. 17, Jianguo E. Rd., Taoyuan City, Taoyuan County 330 (TW)

( * ) Notice: Subject to any disclaimer, the term of this patent is extended or adjusted under 35 U.S.C. 154(b) by 420 days.

(21) Appl. No.: 11/905,767

(22) Filed: Oct. 4, 2007

(65) Prior Publication Data

US 2009/0090805 A1    Apr. 9, 2009

(51) Int. Cl.
*B65H 75/48* (2006.01)
(52) U.S. Cl. .................. 310/76; 310/75 R; 310/77; 310/83; 310/99
(58) Field of Classification Search .............. 310/76, 310/77, 83, 99; B65H 75/48
See application file for complete search history.

(56) References Cited

U.S. PATENT DOCUMENTS

| 4,059,339 | A | * | 11/1977 | Brown | 359/461 |
| 4,663,550 | A | * | 5/1987 | Kawada et al. | 310/93 |
| 4,667,137 | A | * | 5/1987 | Macleod | 318/400.26 |
| 4,712,660 | A | * | 12/1987 | Erndt et al. | 192/18 B |
| 5,550,416 | A | * | 8/1996 | Fanchang et al. | 310/83 |
| 6,870,338 | B2 | * | 3/2005 | Walker et al. | 318/466 |
| 2002/0140302 | A1 | * | 10/2002 | Hsu | 310/75 R |
| 2004/0124727 | A1 | * | 7/2004 | Lau | 310/83 |
| 2005/0121296 | A1 | * | 6/2005 | Haan et al. | 198/780 |
| 2006/0006751 | A1 | * | 1/2006 | Cavarec et al. | 310/77 |
| 2008/0258693 | A1 | * | 10/2008 | Dessirier et al. | 322/29 |

* cited by examiner

*Primary Examiner*—Quyen Leung
*Assistant Examiner*—Terrance Kenerly
(74) *Attorney, Agent, or Firm*—Rosenberg, Klein & Lee (57) ABSTRACT

A power-driven rolling and receiving apparatus includes a housing, a DC brushless motor, a deceleration unit, a motor linker, a control and driving unit, and a first brake unit. The DC brushless motor, the deceleration unit, the motor linker, the control and driving unit and the first brake unit are received in the housing. Two ends of the motor linker are respectively connected with the deceleration unit and the DC brushless motor. The controlling and driving unit is connected with the DC brushless motor. The first brake is located in the controlling and driving unit. Thereby, the dimension of the power-driven rolling and receiving apparatus is smaller, its weight is lighter, its temperature is low and its operation noise is also low.

12 Claims, 11 Drawing Sheets

POWER-DRIVEN ROLLING AND RECEIVING APPARATUS

BACKGROUND OF THE INVENTION

1. Field of the Invention

The present invention relates to a power-driven rolling and receiving apparatus. In particular, this invention relates to an improved structure of the power-driven rolling and receiving apparatus.

2. Description of the Related Art

The driving method of the rolling and receiving apparatus, such as the roller blind, the Rome blind, the horizontal-typed blind, the projection screen, and iron roller gate, has been changed to a power-driving method from a manual-driving method. The power-driven rolling and receiving apparatus uses the induction motor or the DC brush motor as the power source.

Because the induction motor needs a lot of silicon steel flakes and inductance coils, the dimension of the power-driven rolling and receiving apparatus using the induction motor as the power source is large and its weight is heavy. Furthermore, the rotor copper loss is high when the induction motor is operated so that the cooling efficiency is low and the temperature is high. When the induction motor is operated at a low speed, the torque is inadequate.

For the power-driven rolling and receiving apparatus using the DC brush motor as the power source, when the rotor of the DC brush motor rotates to the switch point, the switch flake and the carbon brush of the DC brush motor performs a current switch operation to make the rotor rotate continuously. However, in performing the current switch operation, the carbon brush is worn by the switch flake. When the DC brush motor operates for a long time, the carbon brush becomes aging so that the characteristic of the DC brush motor becomes worse. Therefore, the carbon brush must be replaced at a regular time schedule. The maintain cost increases. Furthermore, when the current switch is performing, a spark is generated so that the DC brush motor is not suitable for operating at a high speed, for a long time, or a dangerous location.

SUMMARY OF THE INVENTION

One particular aspect of the present invention is to provide a power-driven rolling and receiving apparatus. Its dimension is small, its weight is low, it has a low rotor copper loss, its power consumption is low, it has a big torque when it is operated at a low speed, the maintain cost is low, and the spark is not generated.

The power-driven rolling and receiving apparatus includes a housing, a DC brushless motor located in the housing, a deceleration unit received in the housing. The deceleration unit includes an input portion, at least one deceleration gear box, and an output portion. The input portion and the output portion are respectively connected with the two sides of the deceleration gear box. One end of the DC brushless motor is connected with the input portion. The power-driven rolling and receiving apparatus also includes a motor linker, a controlling and driving unit having a control circuit, a driving circuit, and a power circuit, and a first brake unit having a logic circuit and a program control circuit. Two ends of the motor linker are respectively connected with the DC brushless motor and the input portion. The control circuit, the driving circuit and the power circuit are electrically connected together. The driving circuit and the power circuit are electrically connected with the DC brushless motor. The logic circuit and the program control circuit are located in the driving circuit. The logic circuit and the program control circuit are electrically connected with the control circuit. The program control circuit is electrically connected with the DC brushless motor.

The present invention has the following characteristics. Because the dimension of the DC brushless motor is small and its weight is low, the power-driven rolling and receiving apparatus can be miniaturized. Because the rotor copper loss is low, its cooling efficiency is high and the temperature is lower. Because the DC brushless motor has a high torque at low speed and a lower starting current, the power consumption is low. When the DC brushless motor is operated, the spark is not generated, the user does not need to replace the carbon brush at a regular time schedule, and the maintain cost is decreased.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
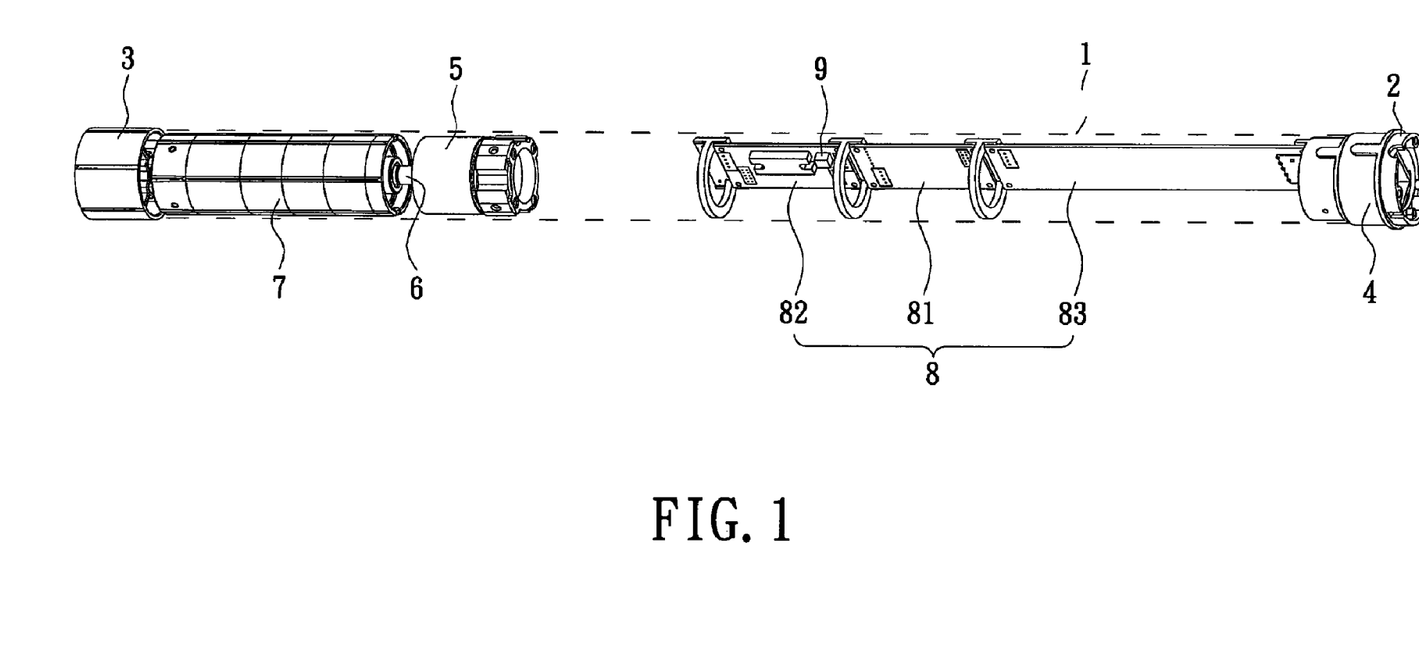
FIG. 1 is an assembly perspective view of the power-driven rolling and receiving apparatus of the present invention.
Figure 2:
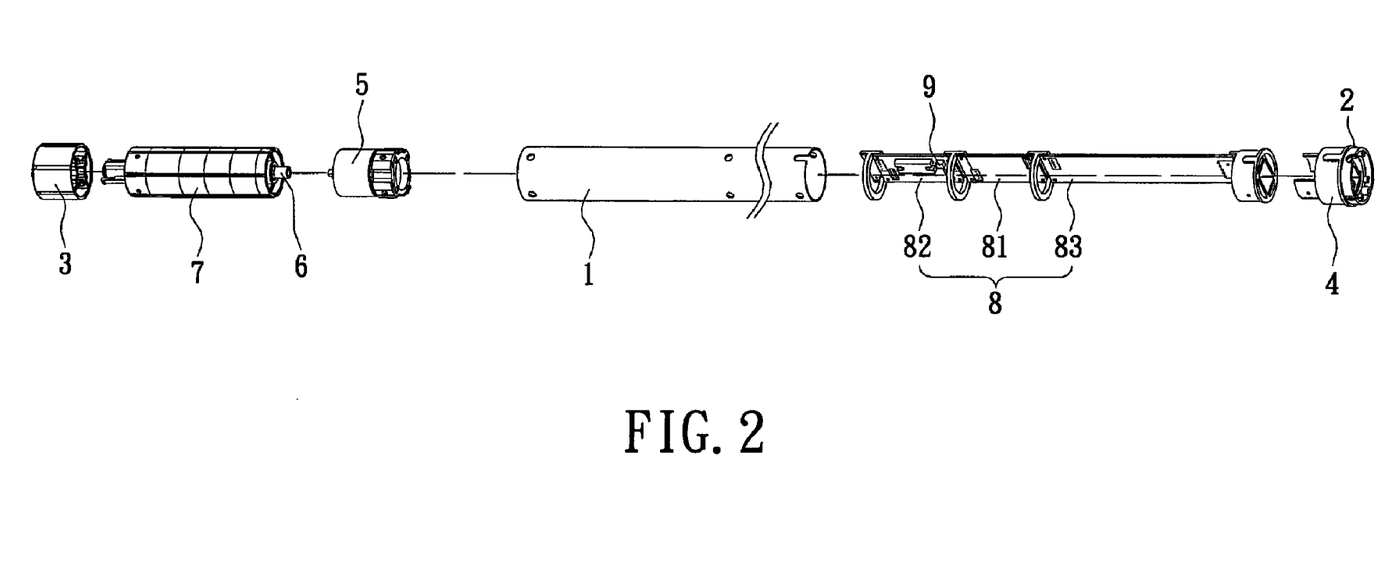
FIG. 2 is an exploded perspective view of the power-driven rolling and receiving apparatus of the present invention.

Reference is made to FIGS. 1 and 2. The power-driven rolling and receiving apparatus includes a housing 1, a terminal cover 2, a transmission wheel 3, a coronal ring 4, a DC brushless motor 5, a motor linker 6, a deceleration unit 7, a controlling and driving unit 8, and a first brake unit 9. The housing 1 is a hollow tube-shaped and has two openings at the two sides of the housing 1. The terminal cover 2 and the transmission wheel 3 are installed the two sides of the housing 1. The coronal ring 4 is sleeved on the outer wall of the terminal cover 2. The electric wire in the housing can extends to outside of the terminal cover 2 for connecting to the external power and the remote controller. The DC brushless motor 5, the motor linker 6, the deceleration unit 7 and the first brake unit 9 are received in the housing 1. The two ends of the motor linker 6 are respectively connected with the DC brushless motor 5 and the deceleration unit 7. The controlling and driving unit 8 can be located in the housing 1 or at outside of the housing 1 (in this embodiment, the controlling and driving unit 8 is located in the housing 1). The first brake unit 9 is located in the controlling and driving unit 8.

Figure 3:
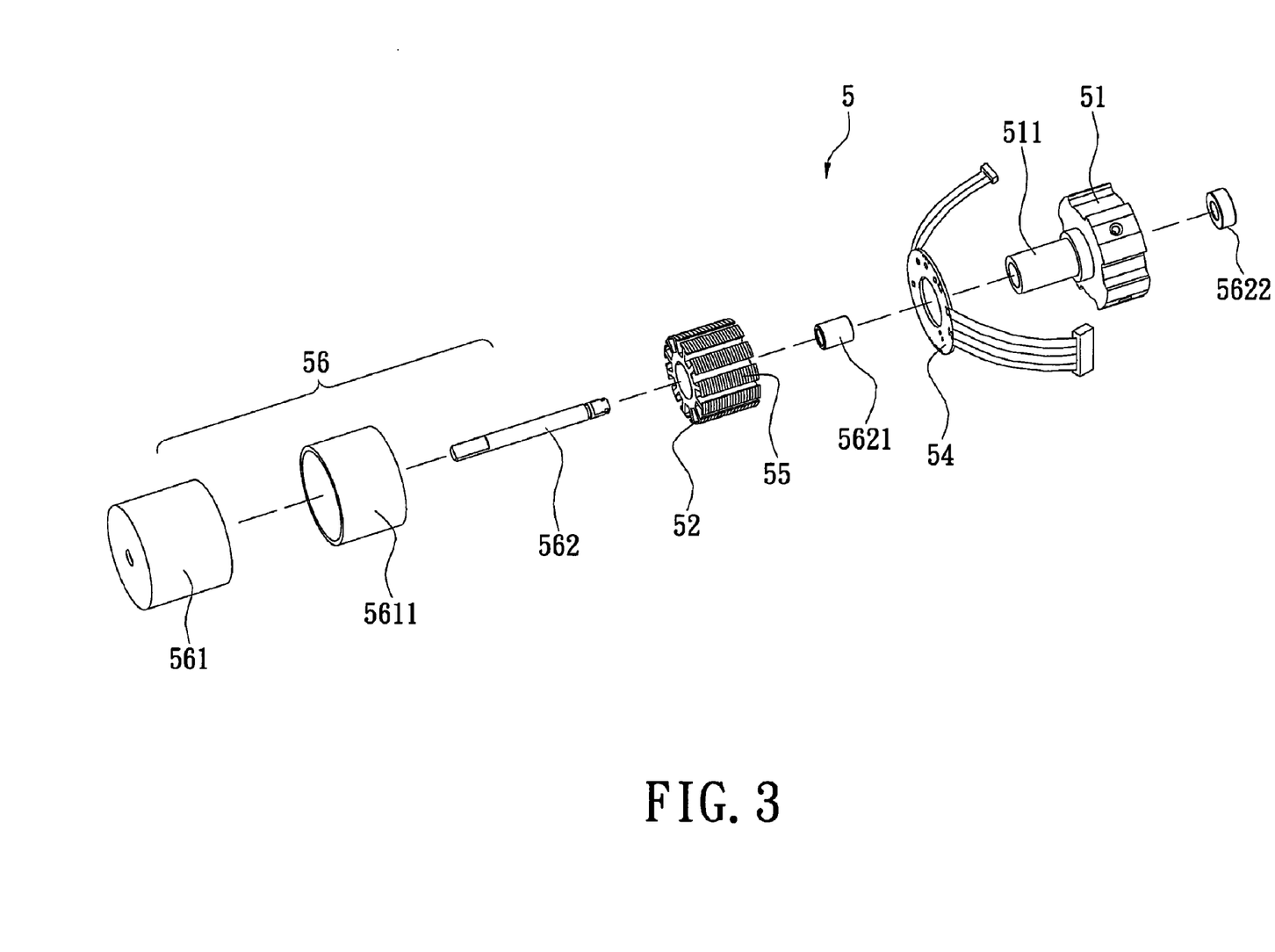
FIG. 3 is an exploded perspective view of the DC brushless motor of the present invention.

As shown in FIG. 3, the DC brushless motor 5 includes a motor fastening base 51, a stator 52, a sensing circuit 54, a plurality of motor coil sets 55, and a rotator 56. A positioning tube 511 protrudes from the motor fastening base 51. The sensing circuit 54 is a circular circuit board. The surface of the sensing circuit 54 is welded with a plurality of hall integrated circuits for detecting the location of the rotor 56. The positioning tube 511 passes through the stator 52 and the sensing circuit 54 for positioning the stator 52 and the sensing circuit 54. The motor coil sets 55 wind around the stator 55 at intervals and are welded onto the sensing circuit 54.

The rotor 56 includes a rotor shell 561 and a rotor shaft 562. The rotor shell 561 sleeves on the exterior of the stator 52. The inner wall of the rotor shell 561 is fastened with a permanent magnet 5611. One end of the rotor shaft 562 passes through and extends to outside of the rotor shell 561. The second end of the rotor shaft 562 passes through and extends to outside of the bottom of the motor fastening base 51. The exterior of the rotor shaft 562 is connected with a first bearing 5621. The first bearing 5621 is connected with the inner wall of the positioning tube 511. The first bearing 5621 is located between the rotor shaft 562 and the inner wall of the positioning tube 511. The first bearing 5621 can be a self-oiling bearing, a self-lubricating bearing, or a ball bearing. The exterior of the second end of the rotor shaft 562 that extends to outside of the bottom of the motor fastening base 51 is connected with a fourth bearing 5622. The fourth bearing 5622 is located between the inner wall of the motor fastening base 51 and the rotor shaft 562 for firmly fastening the rotor shaft 562. The fourth bearing 5622 can be a self-oiling bearing, a self-lubricating bearing, or a ball bearing.

The DC brushless motor 5 is an external rotation motor. However, the DC brushless motor 5 also can be an internal rotation motor. The internal rotation DC brushless motor 5 does not have the rotor shell 561. The permanent magnet 5611 is fastened onto the external wall of the rotor shaft 562. The permanent magnet 5611 and the rotor shaft 562 are received in the interior of the stator 52.

Figure 4:
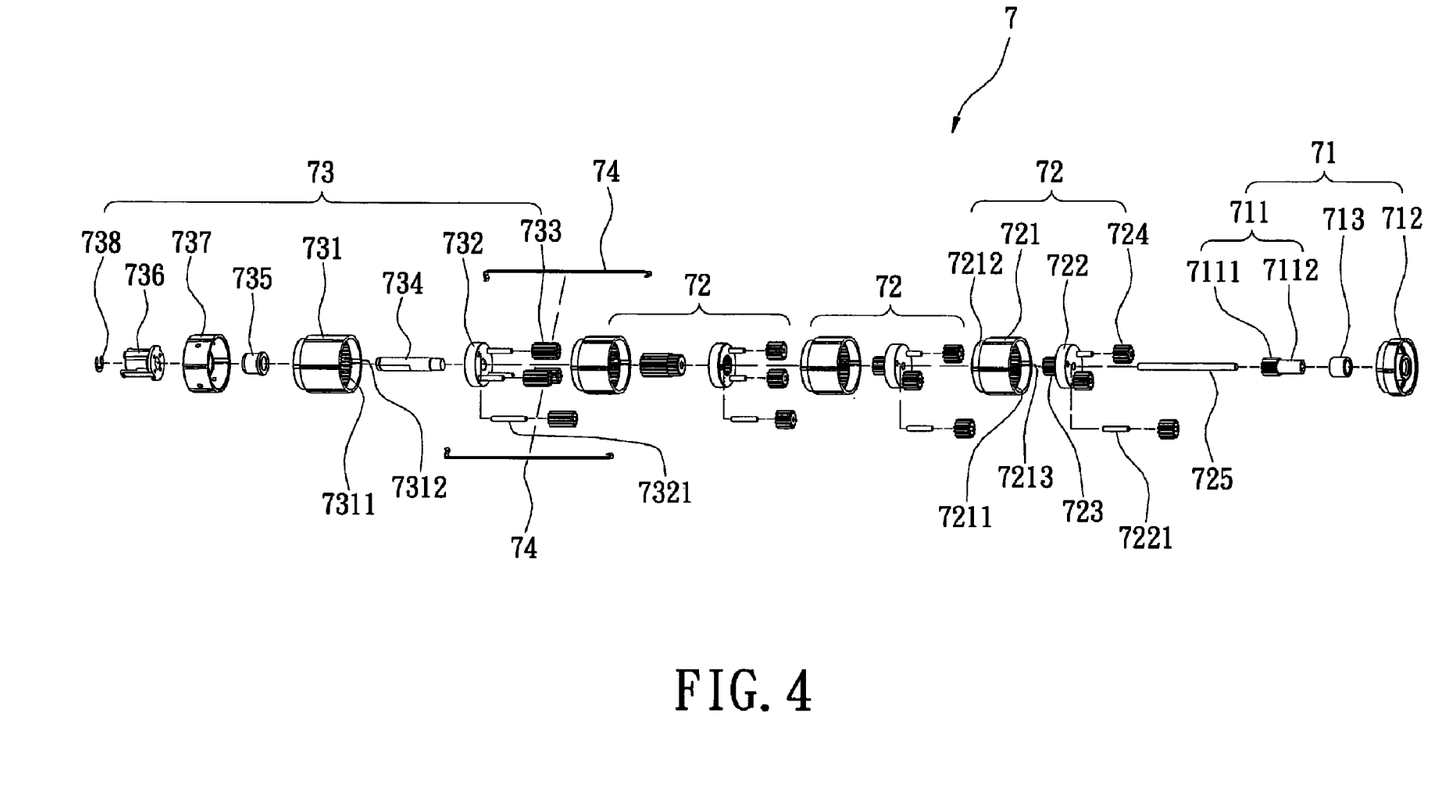
FIG. 4 is an exploded perspective view of the deceleration unit of the present invention.

As shown in FIG. 4, the deceleration unit 7 includes an input portion 71, a plurality of deceleration gear boxes 72, and an output portion 73. The input portion 71 includes a transmission part 711, a front cover 712, and a second bearing 713. The transmission part 711 includes an input gear 7111, and a combining portion 7112. The combining portion 7112 is located on a terminal surface of the input gear 7111. The input gear 7111 and the combining portion 7112 are integrated into one piece. The second end of the combining portion 7112 passes through and extends to outside of the front cover 712. The second bearing 713 is connected with the inner wall of the front cover 712. The second bearing 713 is located between the combining portion 7112 and the inner wall of the front cover 712. The second bearing 713 can be a self-oiling bearing, a self-lubricating bearing, or a ball bearing. One end of the rotor shaft 562 is wedged with the interior of the motor linker 6. The exterior of the motor linker 6 is wedged with the interior of the combining portion 7112.

Each of the deceleration gear boxes 72 includes a first box 721, a first disk body 722, a sun gear 723, and a plurality of first planetary gears 724. The inner wall of the first box 721 has a first inner gear 7211. The first disk body 722 is movably installed in the interior of the first box 721. One side of the first disk body 722 is fastened with a plurality of first positioning columns 7221. The first positioning columns 7221 respectively pass through the first planetary gears 724. The first planetary gears 724 gear with the first inner gear 7211. The sun gear 723 is fastened onto the second side of the first disk body 722.

The exterior and the interior of the first box 721 are disposed with a plurality of first wedging strips 7212 and first wedging slots 7213 at intervals. The first wedging strip 7212 of the first box 721 is wedged with the first wedging slot 7213 of the adjacent first box 721 so that deceleration gear boxes 72 are connected together in serial. The deceleration ratio of the deceleration unit 7 is determined by the number of the deceleration gear boxes 72. Moreover, the first disk body 722 and the sun gear 723 are plugged with a positioning shaft 725 so that the first disk body 722 and the sun gear 723 rotate in concentric circles. The input gear 7111 gears with the first planetary gear 724 of the adjacent deceleration gear box 72.

The output portion 73 includes a second box 731, a second disk body 732, a plurality of second planetary gears 733, an output shaft 734, a third bearing 735, an output shaft linker 736 and a rear cover 737. The inner wall of the second box 731 has a second inner gear 7311. The second disk body 732 is movably installed on the inner wall of the second box 731. One side of the second disk body 732 is fastened with a plurality of second positioning columns 7321. The second positioning columns 7321 respectively pass through the second planetary gears 733. The second planetary gears 733 gear with the second inner gear 7311. One end of the output shaft 734 is wedged with the second side of the second disk body 732. The second end of the output shaft 734 is plugged into the output shaft linker 736. The third bearing 735 is connected with the inner wall of the rear cover 737. The third bearing 735 is located between the output shaft 734 and the inner wall of the rear cover 737. The third bearing 735 can be a self-oiling bearing, a self-lubricating bearing, or a ball bearing. The rear cover 737 is wedged with the exterior of the second box 731. The output shaft linker 736 is connected with the interior of the transmission wheel 3 (refer to FIG. 1). When the output shaft 734 rotates, the output shaft linker 736 and the transmission wheel 3 are also rotated by the output shaft 734. One end of the exterior of the output shaft linker 736 can be wedged with an E-shaped buckling ring 738 for preventing the output shaft linker 736 from detaching from the output shaft 734.

The interior of the second box 731 are disposed with a plurality of second wedging slots 7312 at intervals. The second wedging slot 7312 of the second box 731 is wedged with the first wedging strip 7212 of the adjacent first box 721. The second planetary gear 733 of the second box 731 gears with the sun gear 723 in the adjacent first box 721. Moreover, the deceleration unit 7 is buckled with a gear box buckling strip 74. One end of the gear box buckling strip 74 is buckled with the front cover 712. The second end of the gear box buckling strip 74 is buckled with the rear cover 737. Thereby, the first box 721 and the second box 731 are firmly buckled.

As shown in FIG. 1, the controlling and driving unit 8 includes a control circuit 81, a driving circuit 82, and a power circuit 83. All the control circuit 81, the driving circuit 82 and the power circuit 83 are circuit boards. The control circuit 81, the driving circuit 82 and the power circuit 83 are electrically connected together. The sensing circuit 54 is connected with the signal wire and the power wire (refer to FIG. 3). The signal wire and the power wire can be electrically connected with the driving circuit 82. On the surface of the control circuit 81, there is a receiver (not shown) for receiving the instruction sent from the remote controller. The power circuit 83 has a rectifying and voltage-transforming device. The rectifying and voltage-transforming device reduces the inputted AC, converts the AC into DC, and outputs the DC to the control circuit 81 for providing the required power.

Figure 5:
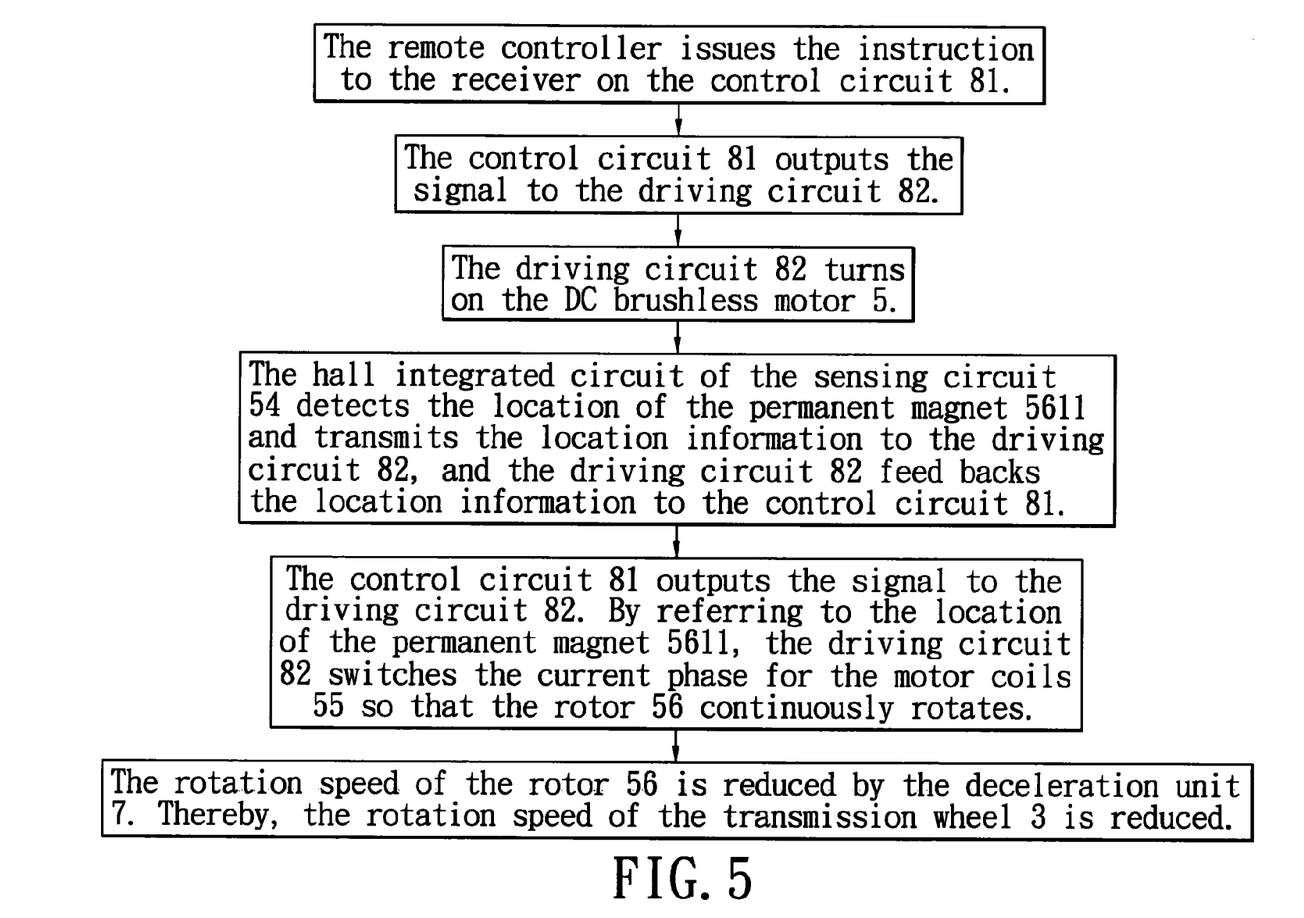
FIG. 5 is a flow chart for driving the power-driven rolling and receiving apparatus of the present invention.

As shown in FIG. 5, the driving flow chart for the power-driven rolling and receiving apparatus is described as following:

1. The remote controller issues the instruction to the receiver on the control circuit 81.

2. The control circuit 81 outputs the signal to the driving circuit 82.

3. The driving circuit 82 turns on the DC brushless motor 5.

4. The hall integrated circuit of the sensing circuit 54 detects the location of the permanent magnet 5611, and transmits the location information to the driving circuit 82. The driving circuit 82 feed backs the location information to the control circuit 81.

5. The control circuit 81 outputs the signal to the driving circuit 82. By referring to the location of the permanent magnet 5611, the driving circuit 82 switches the current phase for the motor coils 55 so that the rotor 56 continuously rotates.

6. The rotation speed of the rotor 56 is reduced by the deceleration unit 7. Thereby, the rotation speed of the transmission wheel 3 is reduced.

Figure 6:
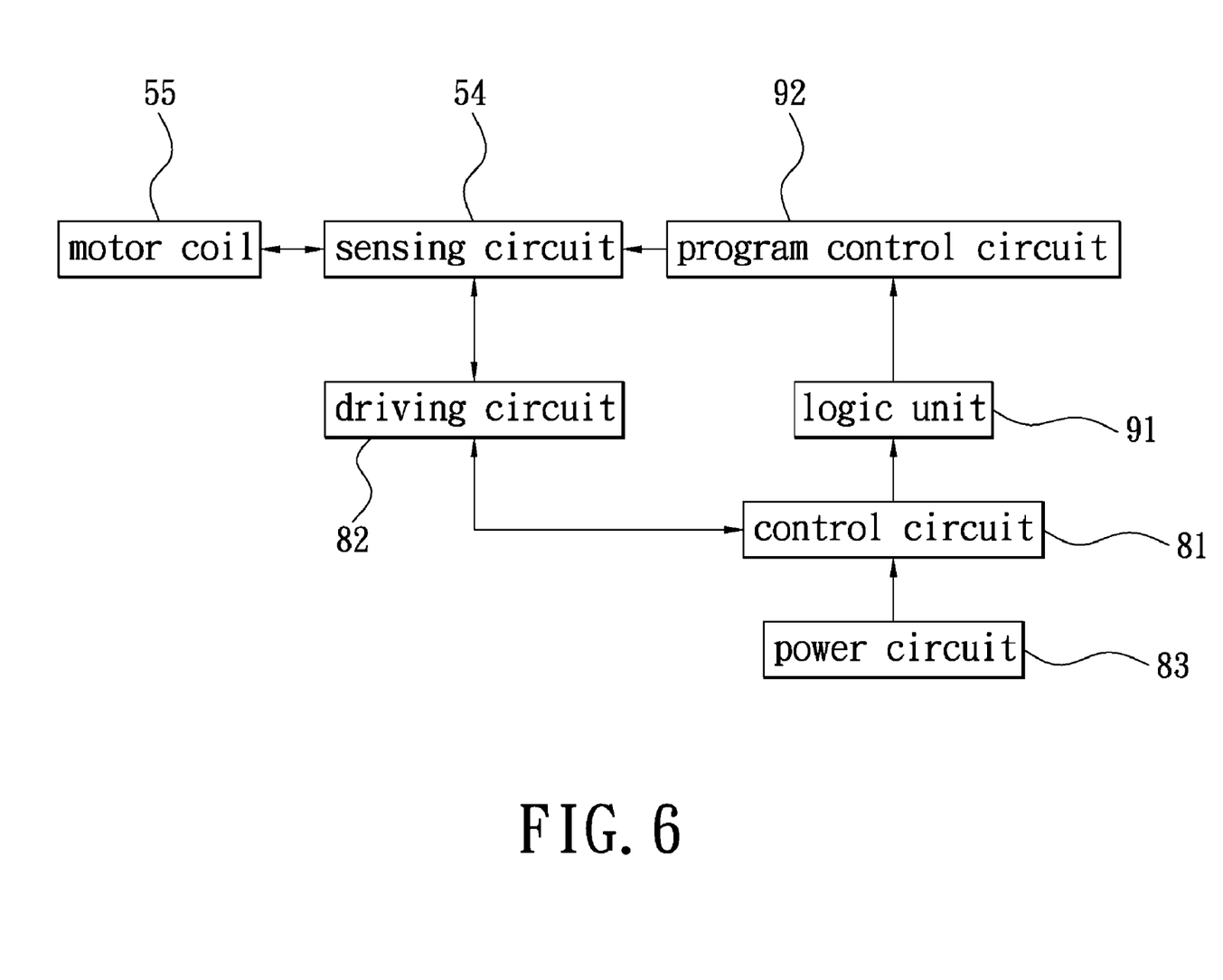
FIG. 6 is a schematic diagram of the first brake unit of the present invention.

As shown in FIGS. 1 and 6, the first brake unit 9 is an electronic brake, such as a lower arm conductance, tri-phase conductance, or inverse-phase conductance etc. The first brake unit 9 includes a logic circuit 91 and a program control circuit 92. The logic circuit 91 and the program control circuit 92 are located on the driving circuit 82. The logic circuit 91, the program control circuit 92 and the control circuit 81 are electrically connected. The power circuit 83 is electrically connected with the control circuit 81. The program control circuit 92 is electrically connected with the sensing circuit 54. The control circuit 81 issues an instruction, such as forward rotation, backward rotation, or braking. After the logic circuit 91 judges the instruction of the control circuit 81, the signal is transmitted to the program control circuit 92. The program control circuit 92 judges the signal of the logic circuit 91 to determine the current outputted to the sensing circuit 54. The sensing circuit 54 outputs the current to the motor coils 55.

Figure 7:
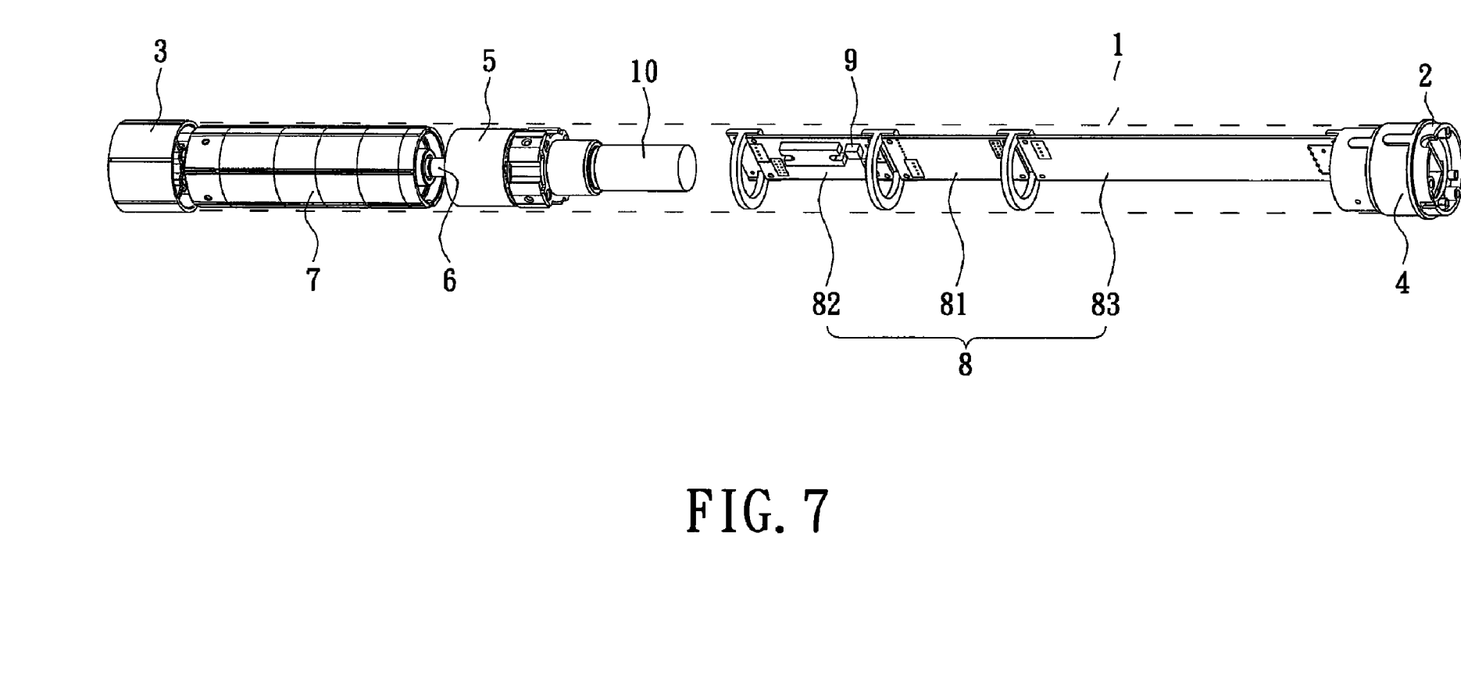
FIG. 7 is a perspective view of the power-driven rolling and receiving apparatus of the second embodiment of the present invention.
Figure 8:
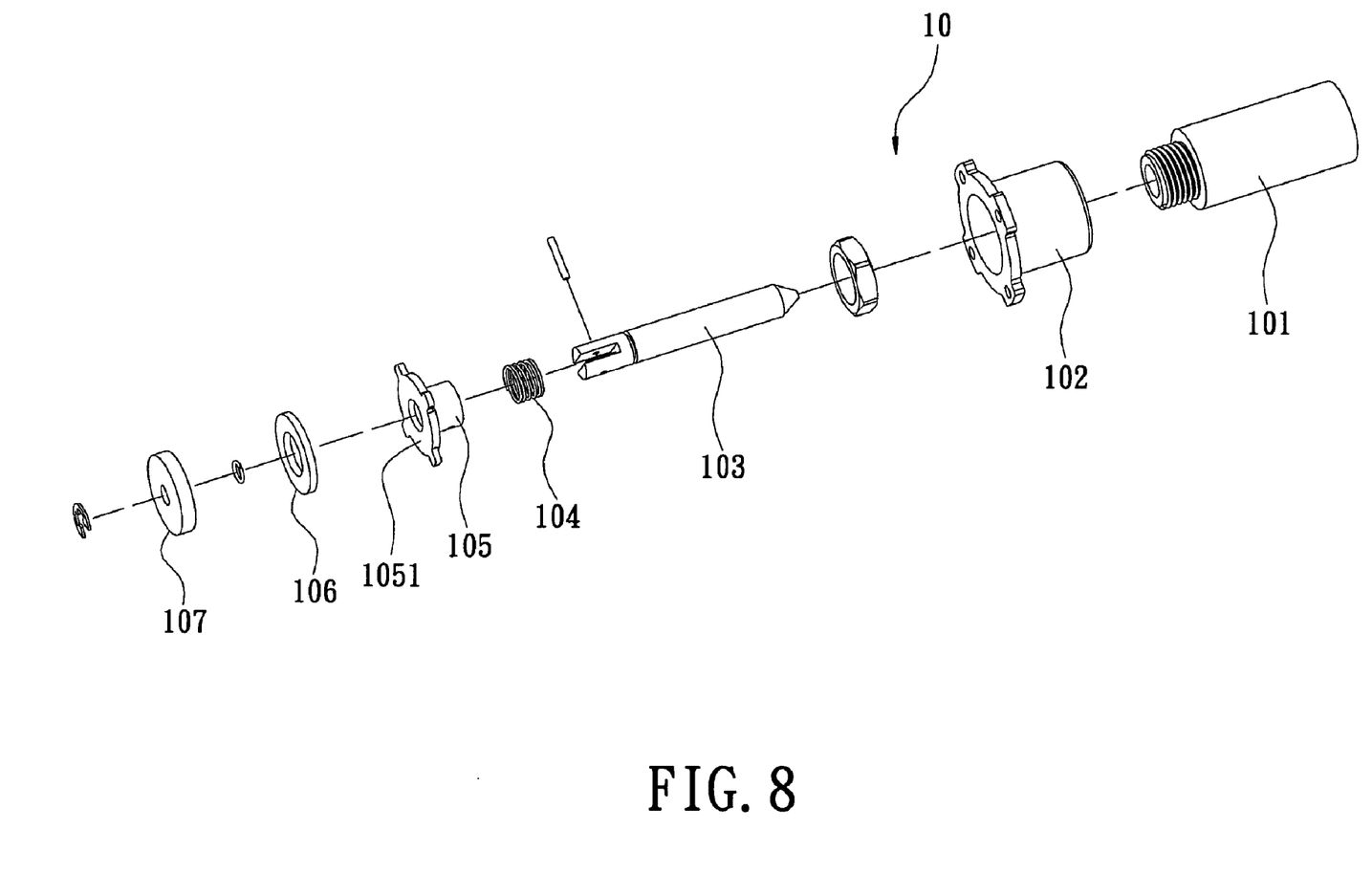
FIG. 8 is an exploded perspective view of the second brake unit of the present invention.

As shown in FIG. 7, the power-driven rolling and receiving apparatus can be installed with a second brake unit 10. The second brake unit 10 is a mechanical brake. The second brake unit 10 can enhance the locking force of the power-driven rolling and receiving apparatus. The second brake unit 10 is connected with the DC brushless motor 5. The second brake unit 10 includes an electromagnet housing 101, an electromagnet fastening base 102, a movable iron core 103, a spring 104, a brake fastening base 105, a brake flake 106, and a brake base 107. The interior of the electromagnet housing 101 is wound with coils (not shown in the figure). The electromagnet housing 101 is locked and fastened on the electromagnet fastening base 102. The movable iron core 103 passes through the electromagnet fastening base 102 and is plugged into the interior of the electromagnet housing 101. The spring 104 is sleeved on the movable iron core 103 and is installed between the electromagnet housing 101 and the brake fastening base 105. The movable iron core 103 and the brake fastening base 105 are combined by a pin. The brake base 107 is installed at the bottom of the motor fastening base 51. The brake flake 106 is wedged with a terminal surface of the brake base 107. One end of the rotor shaft 562 passes through the brake flake 106 and the brake base 107. The brake fastening base 105 has a contacting surface 1051. The contacting surface 1051 corresponds to the brake flake 106.

Figure 9:
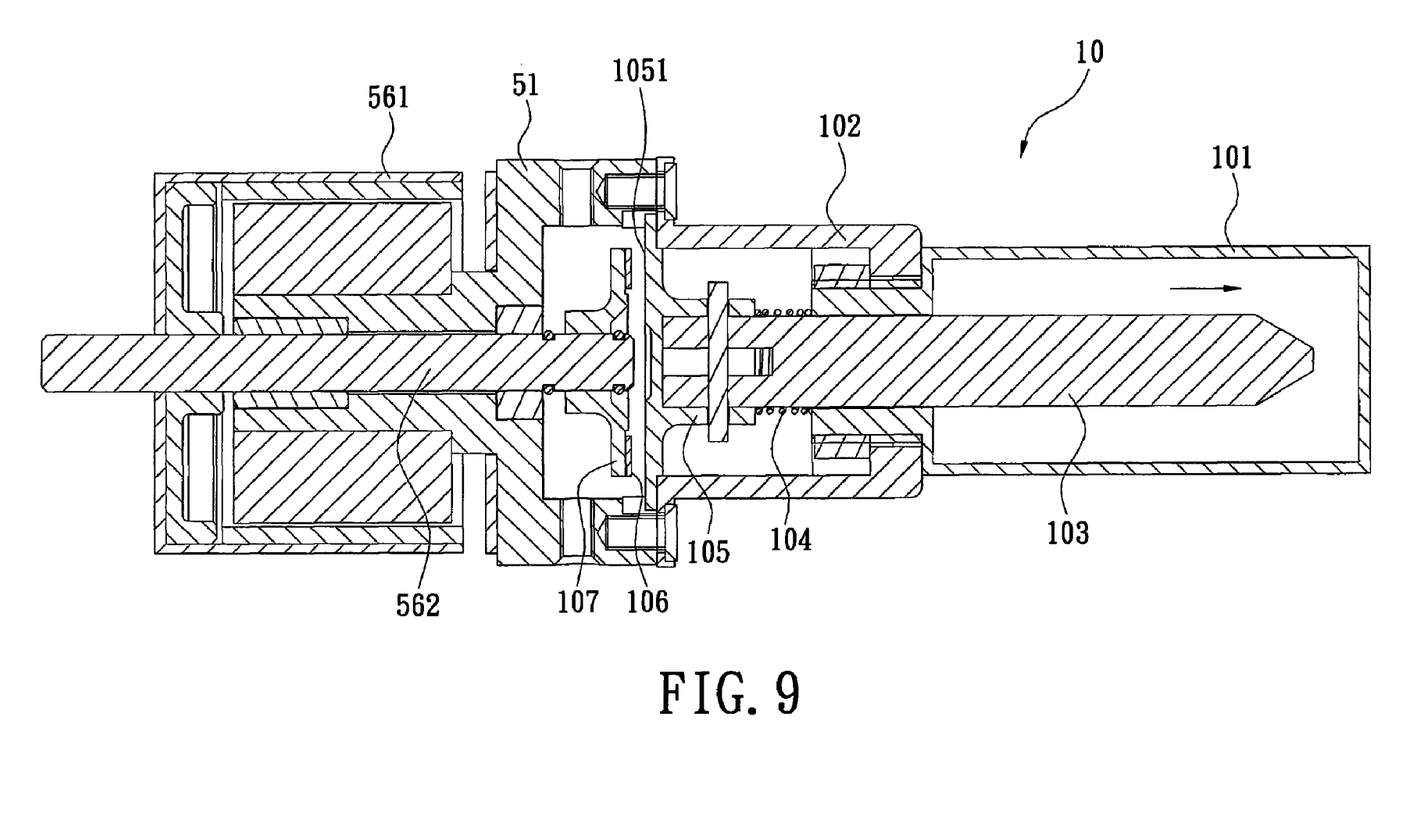
FIG. 9 is a cross-sectional view of the DC brushless motor of the present invention connected with the second brake unit.
Figure 10:
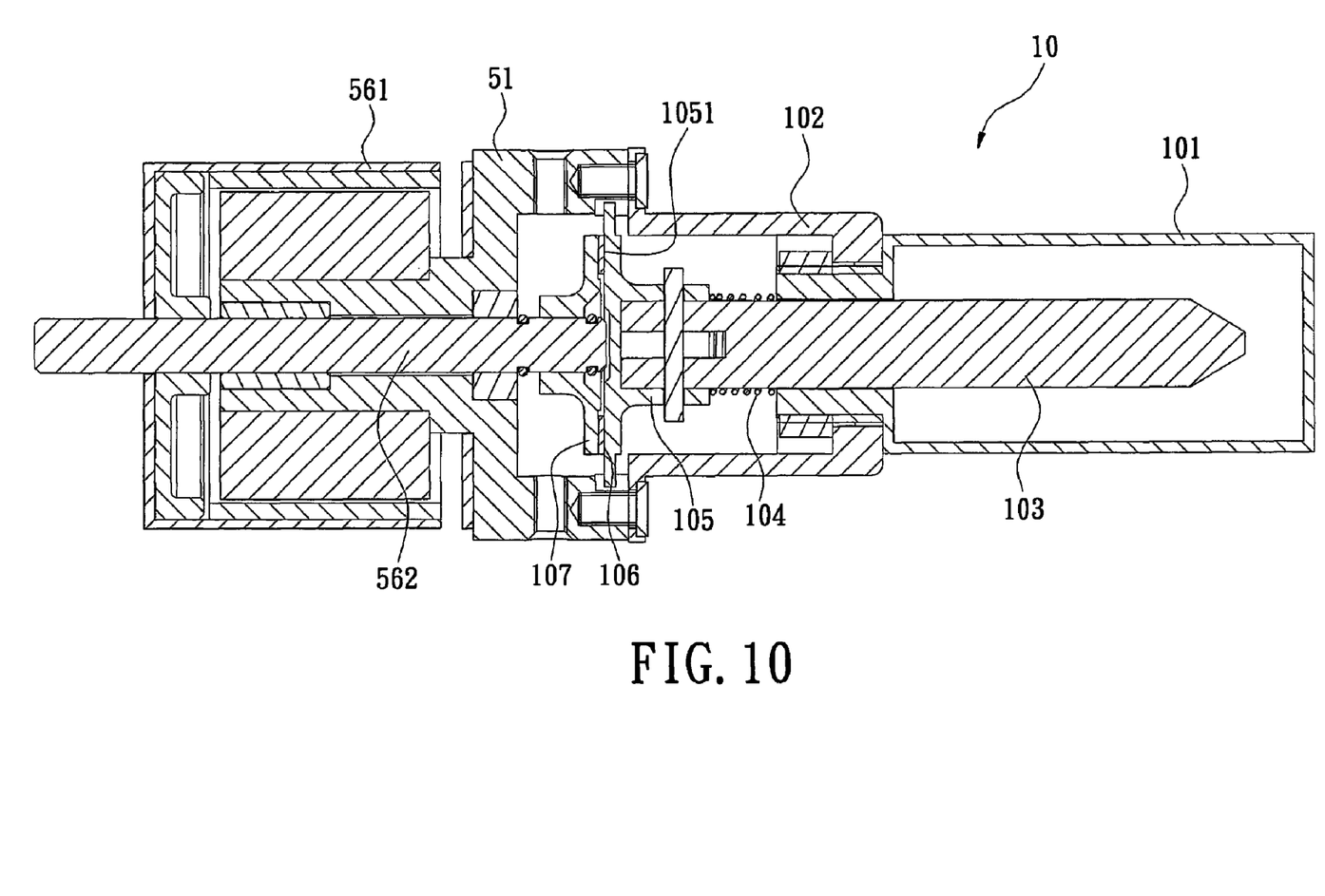
FIG. 10 is another cross-sectional view of the DC brushless motor of the present invention connected with the second brake unit.

As shown in FIGS. 9 and 10, when the DC brushless motor 5 is conducted with the power, the electromagnet housing 101 generates an attractive force to the movable iron core 103 that is larger than the flexible force of the spring 104 so that the movable iron core 103 and the brake fastening base 105 move forwards to the direction that is far away from the brake flake 106. Thereby, the brake fastening base 105 and the brake flake 106 are separated from each other for a distance so that the rotor shaft 562 continuously rotates. When the DC brushless motor 5 is not provided with the power, the attractive force of the electromagnet housing 101 disappears. The movable iron core 103 and the brake fastening base 105 are recovered to their original locations due to the flexible force of the spring 104. Thereby, the contacting surface 1051 of the brake fastening base 105 press on the brake flake 106 to generate the friction force to stop the rotor shaft 562.

Figure 11:
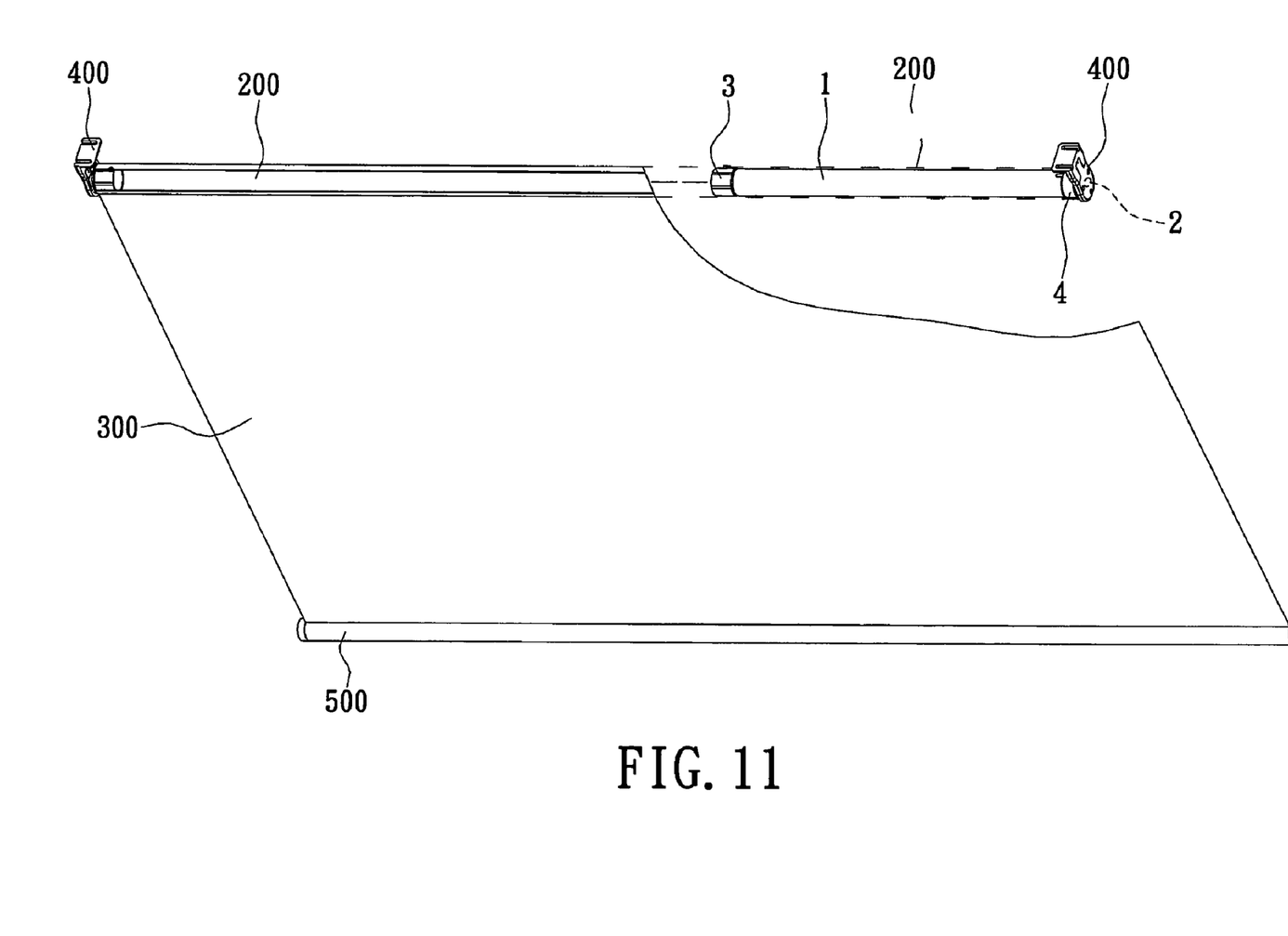
FIG. 11 is a schematic diagram of the power-driven rolling and receiving apparatus of the present invention applied to a roller blind.

The power-driven rolling and receiving apparatus can be applied to the products with a rolling and receiving apparatus, such as the roller blind, the Rome blind, the horizontal-typed blind, the projection screen, and iron roller gate, etc. FIG. 11 shows a schematic diagram of the power-driven rolling and receiving apparatus being applied to the roller blind. The exterior of the housing 1 is sleeved with an external tube 200. The external tube 200 is a hollow tube-shaped metal piece. The external wall of the external tube 200 is rolled with a roller blind. One end of the external tube 200 is enclosed with a terminal cover 2, and the terminal cover 2 is sleeved with a coronal ring 4. The second end of the external tube 200 is enclosed with an external cover (not labeled) and the inner wall of the external tube 200 is connected with an idle pulley (not labeled). The external cover and the idle pulley are plugged with a shaft body (not shown). The external tube 200 is locked with the exterior of the transmission wheel 3. The terminal cover 2 and one side of the external cover are respectively fastened with a roller blind fastening base 400. Thereby, the roller blind fastening base 400 can fasten the power-driven rolling and receiving apparatus above the window or on the wall.

When the power-driven rolling and receiving apparatus is turned on, the transmission wheel 3 (refer to FIG. 1) rotates clockwise or counterclockwise to make the coronal ring 4 and the external tube 200 rotate clockwise or counterclockwise. Thereby, the roller blind 300 on the external tube 200 ascends or descends. Furthermore, one end of the roller blind 300 can be installed with a vertical tube 500 to increase the stability when the roller blind 300 is ascended or descended.

The present invention has the following characteristics:

1. The dimension of the DC brushless motor 5 is smaller and its weight is lighter. The power-driven rolling and receiving apparatus can be miniaturized.

2. When the DC brushless motor 5 is operated under a low rotation speed, the torque is stronger and its loading ability is good, and it does not generate the spark and has a lower noise. It is suitable for a high rotation speed, a long operation time and a high dangerous environment. the user does not need to replace the carbon brush at a regular time schedule, and the maintain cost is decreased.

3. Because the starting current of the DC brushless motor 5 is low, the required power is low. The copper loss is low so that the cooling efficiency is high and the temperature is low.

4. By merely changing the quantity of the deceleration gear boxes 72 or the quantity of gear teeth or the quantity of the inner gear, the different deceleration ratios can be achieved.

Therefore, it does not need to manufacture a lot of deceleration mechanisms for different deceleration ratios. The cost is reduced.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A power-driven rolling and receiving apparatus, comprising:
   a housing;
   a DC brushless motor located in the housing,
   a deceleration unit received in the housing, wherein the deceleration unit includes an input portion, a plurality of deceleration gear boxes and an output portion, the input portion and the output portion are respectively connected with the two sides of the deceleration gear boxes, and one end of the DC brushless motor is connected with the input portion, each of the deceleration gear boxes comprising a first box, a plurality of first wedging strips and a plurality of first wedging slots, the first wedging strips are disposed on the exterior of the first box at intervals, the first wedging slots are disposed on the interior of the first box at intervals, the deceleration gear boxes are connected in series by wedging the first wedging strips with the adjacent first wedging slots;
   a motor linker, wherein two ends of the motor linker are respectively connected with the DC brushless motor and the input portion;
   a controlling and driving unit having a control circuit, a driving circuit, and a power circuit, wherein the control circuit, the driving circuit and the power circuit are electrically connected together, and the driving circuit and the power circuit are electrically connected with the DC brushless motor; and
   a first brake unit having a logic circuit and a program control circuit, wherein the logic circuit and the program control circuit are located on the driving circuit, the logic circuit and the program control circuit are electrically connected with the control circuit, and the program control circuit is electrically connected with the DC brushless motor.

2. The power-driven rolling and receiving apparatus as claimed in claim 1, wherein the DC brushless motor comprises a stator, a sensing circuit, a motor fastening base, a plurality of motor coil sets, and a rotator, the stator and the sensing circuit are fastened on the motor fastening base, the motor coil sets are wound around the stator at intervals and is welded with the sensing circuit, the rotor includes a rotor shell and a rotor shaft, the rotor shell is sleeved on the exterior of the stator, one end of the rotor shaft passes through and extends to outside of the top of the rotor shaft and is wedged with the interior of the motor linker, the second end of the rotor shaft passes through and extends to outside of the bottom of the motor fastening base, and the inner wall of the rotor shell is fastened with a permanent magnet.

3. The power-driven rolling and receiving apparatus as claimed in claim 2, wherein the driving circuit and the program control circuit are electrically connected with the sensing circuit.

4. The power-driven rolling and receiving apparatus as claimed in claim 2, further comprising a second brake unit, wherein the second brake unit includes an electromagnet housing, an electromagnet fastening base, a movable iron core, a spring, a brake fastening base, a brake flake, and a brake base, the electromagnet housing is locked and fastened on the electromagnet fastening base, the movable iron core passes through the interior of the electromagnet housing, the spring is sleeved on the movable iron core and is installed between the electromagnet housing and the brake fastening base, the brake base is installed at the bottom of the motor fastening base, the brake flake is wedged with a terminal surface of the brake base, one end of the rotor shaft passes through the brake flake and the brake base, the brake fastening base has a contacting surface, and the contacting surface corresponds to the brake flake.

5. The power-driven rolling and receiving apparatus as claimed in claim 1, wherein each of the deceleration gear boxes comprises a first box, a first disk body, a sun gear, and a plurality of first planetary gears, the inner wall of the first box has a first inner gear, the first disk body is movably installed in the interior of the first box, one side of the first disk body is fastened with a plurality of first positioning columns, the first positioning columns respectively pass through the first planetary gears, the first planetary gears gear with the first inner gear, and the sun gear is fastened onto the second side of the first disk body.

6. The power-driven rolling and receiving apparatus as claimed in claim 5, wherein the input portion includes a transmission part, the transmission part includes an input gear, and a combining portion, the combining portion is located on a terminal surface of the input gear, the input gear and the combining portion are integrated into one piece, the exterior of the motor linker is wedged with the interior of the combining portion, and the input gear gears with the first planetary gears.

7. The power-driven rolling and receiving apparatus as claimed in claim 5, wherein the output portion includes a second box, a second disk body, a plurality of second planetary gears, and an output shaft, the inner wall of the second box has a second inner gear, the second disk body is movably installed in the interior of the second box, one side of the second disk body is fastened with a plurality of second positioning columns, the second positioning columns respectively pass through the second planetary gears, the second planetary gears gear with the second inner gear, the output shaft is fastened at the second side of the second disk body, and the sun gear of the first disk body gears with the second planetary gears.

8. The power-driven rolling and receiving apparatus as claimed in claim 7, the interior of the second box are disposed with a plurality of second wedging slots at intervals, and the first wedging strips of one of the deceleration gear boxes are respectively wedged with the second wedging slots.

9. The power-driven rolling and receiving apparatus as claimed in claim 1, wherein the control and driving unit is received in the housing or outside of the housing.

10. The power-driven rolling and receiving apparatus as claimed in claim 1, wherein the DC brushless motor comprises a stator, a sensing circuit, a motor fastening base, a plurality of motor coil sets, and a rotator shaft, the stator and the sensing circuit are fastened on the motor fastening base, the motor coil sets are wound around the stator at intervals and are welded with the sensing circuit, the exterior of the rotor shaft is fastened with a permanent magnet, the permanent magnet and the rotator shaft are received in the interior of the stator, one end of the rotor shaft passes through and extends to outside of the bottom of the motor fastening base, and the second end of the rotor shaft is wedged with the interior of the motor linker.

11. The power-driven rolling and receiving apparatus as claimed in claim 10, wherein the driving circuit and the program control circuit are electrically connected with the sensing circuit.

12. The power-driven rolling and receiving apparatus as claimed in claim 10, further comprising a second brake unit, wherein the second brake unit includes an electromagnet housing, an electromagnet fastening base, a movable iron core, a spring, a brake fastening base, a brake flake, and a brake base, the electromagnet housing is locked and fastened on the electromagnet fastening base, the movable iron core passes through the interior of the electromagnet housing, the spring is sleeved on the movable iron core and is installed between the electromagnet housing and the brake fastening base, the brake base is installed at the bottom of the motor fastening base, the brake flake is wedged with a terminal surface of the brake base, one end of the rotor shaft passes through the brake flake and the brake base, the brake fastening base has a contacting surface, and the contacting surface corresponds to the brake flake.

* * * * *